United States Patent
Tomat

[19]

[11] Patent Number: 6,092,251
[45] Date of Patent: Jul. 25, 2000

[54] METHOD FOR MANUFACTURING SHOES AND SHOE OBTAINED WITH THE METHOD

[75] Inventor: Andrea Tomat, Montebelluna, Italy

[73] Assignee: Stonefly S.p.A., Casella D'Asolo, Italy

[21] Appl. No.: 09/199,196

[22] Filed: Nov. 25, 1998

[30] Foreign Application Priority Data

Nov. 28, 1997 [IT] Italy ................... TV97A0168

[51] Int. Cl.⁷ ...................................... A43D 9/00
[52] U.S. Cl. ...................... 12/142 P; 12/142 RS; 12/148; 36/28; 36/30 R; 36/30 A; 36/31; 36/59 A; 36/59 B
[58] Field of Search ............... 36/28, 30 R, 30 A, 36/31, 59 A, 59 B, 59 R, 14, 59 C; 12/142 P, 142 RS, 148

[56] References Cited

U.S. PATENT DOCUMENTS

| | | |
|---|---|---|
| 1,315,482 | 9/1919 | Dyer . |
| 2,383,117 | 8/1945 | Fellman . |
| 3,807,061 | 4/1974 | Krus et al. . |
| 4,316,332 | 2/1982 | Giese et al. . |
| 4,858,340 | 8/1989 | Pasternak . |
| 5,012,597 | 5/1991 | Thomasson . |
| 5,287,638 | 2/1994 | Preston . |
| 5,775,005 | 7/1998 | McClelland . |
| 5,862,614 | 1/1999 | Koh . |

*Primary Examiner*—Ted Kavanaugh
*Attorney, Agent, or Firm*—Guido Modiano; Albert Josif

[57] ABSTRACT

A method of manufacturing a shoe, provided with a front region and a heel region. The method comprises the steps of stitching an upper to a piece of fabric in order to obtain an inner shoe which is closed at its lower portion, providing a rubber mid-sole having at least one inner cavity or seat and at least one outer cavity or seat, filling the at least one inner cavity with a lightweight filler, coupling said inner shoe with the mid-sole by a peripheral cover band, vulcanizing and placing one or more inserts in the at least one outer cavity or seat.

9 Claims, 3 Drawing Sheets

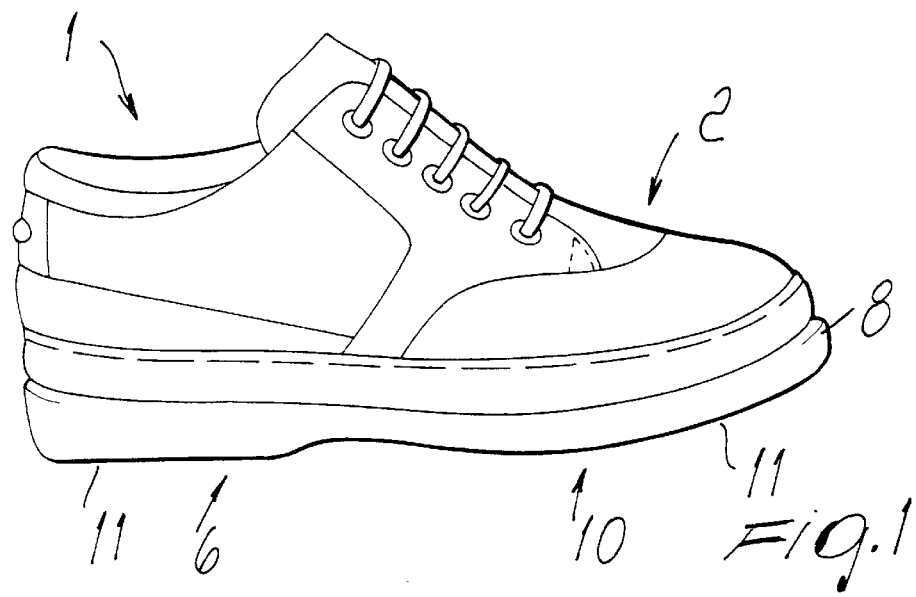
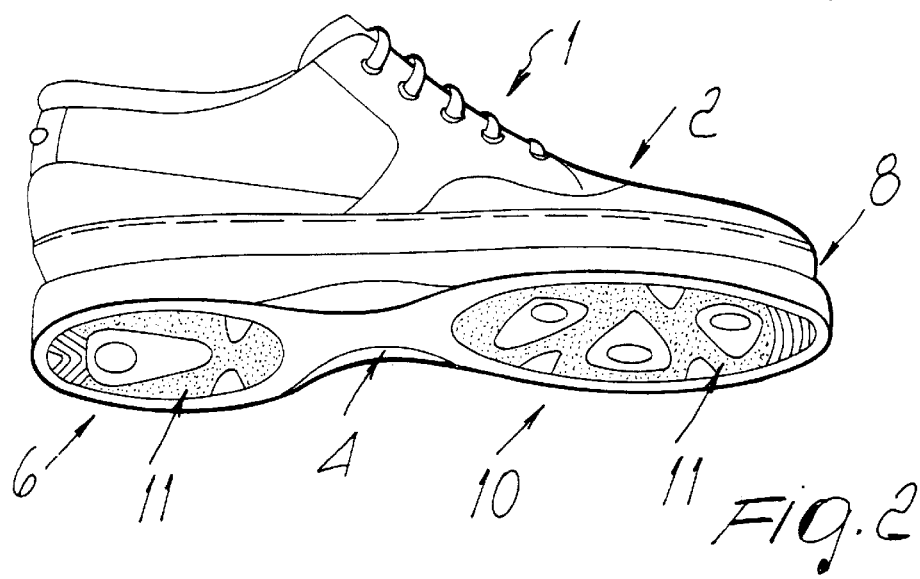
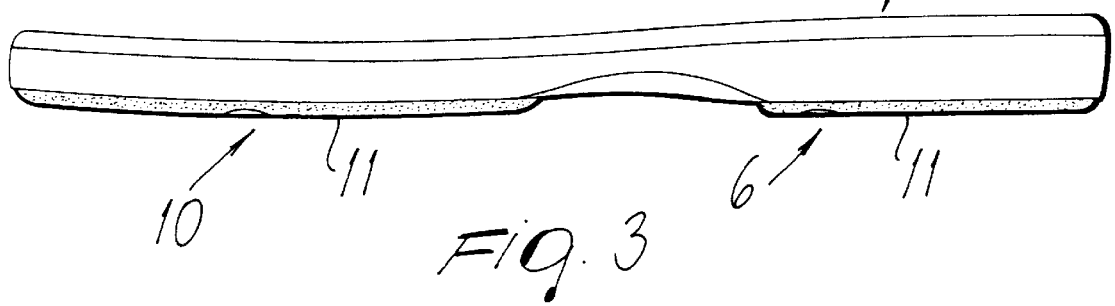

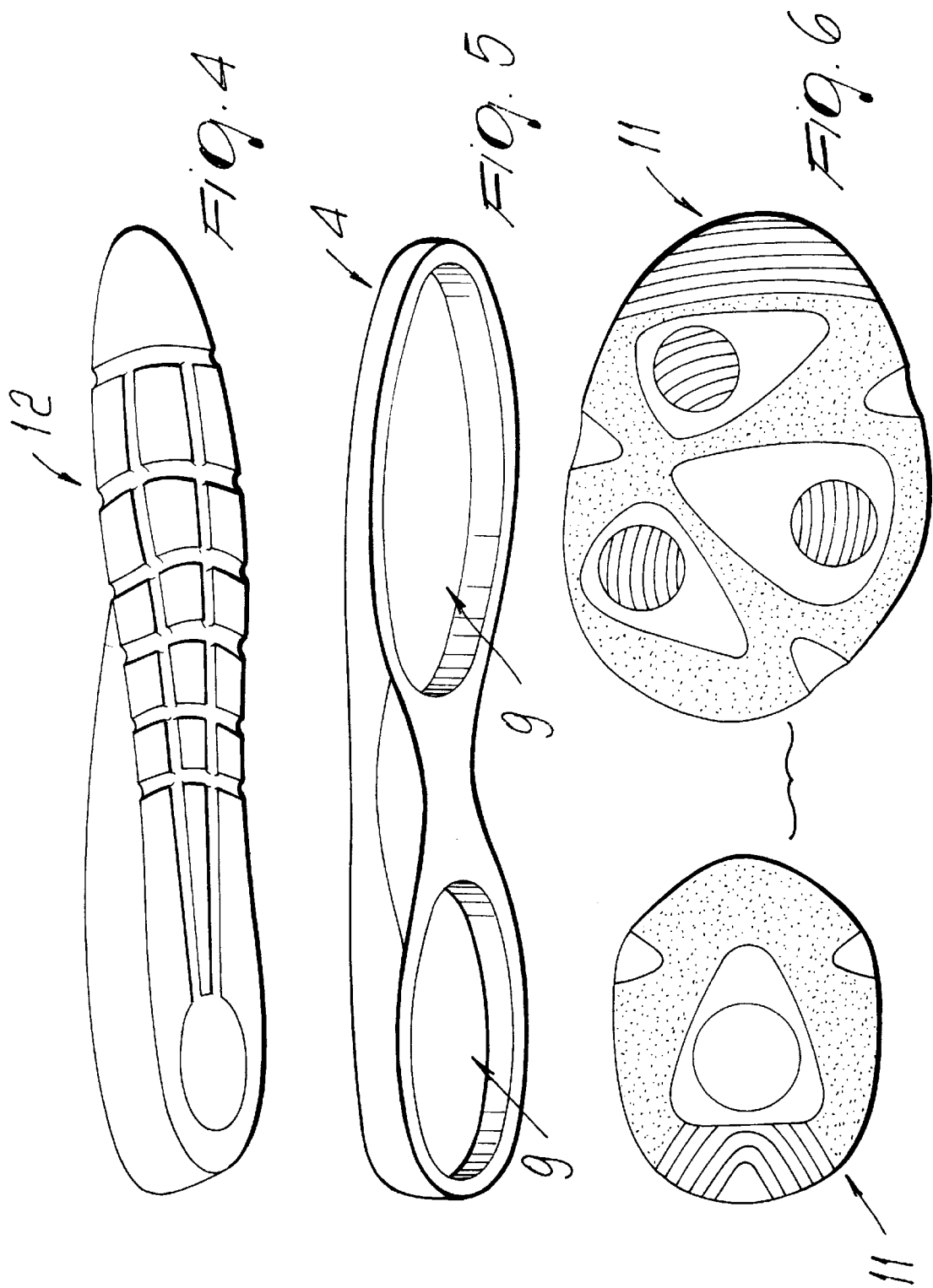

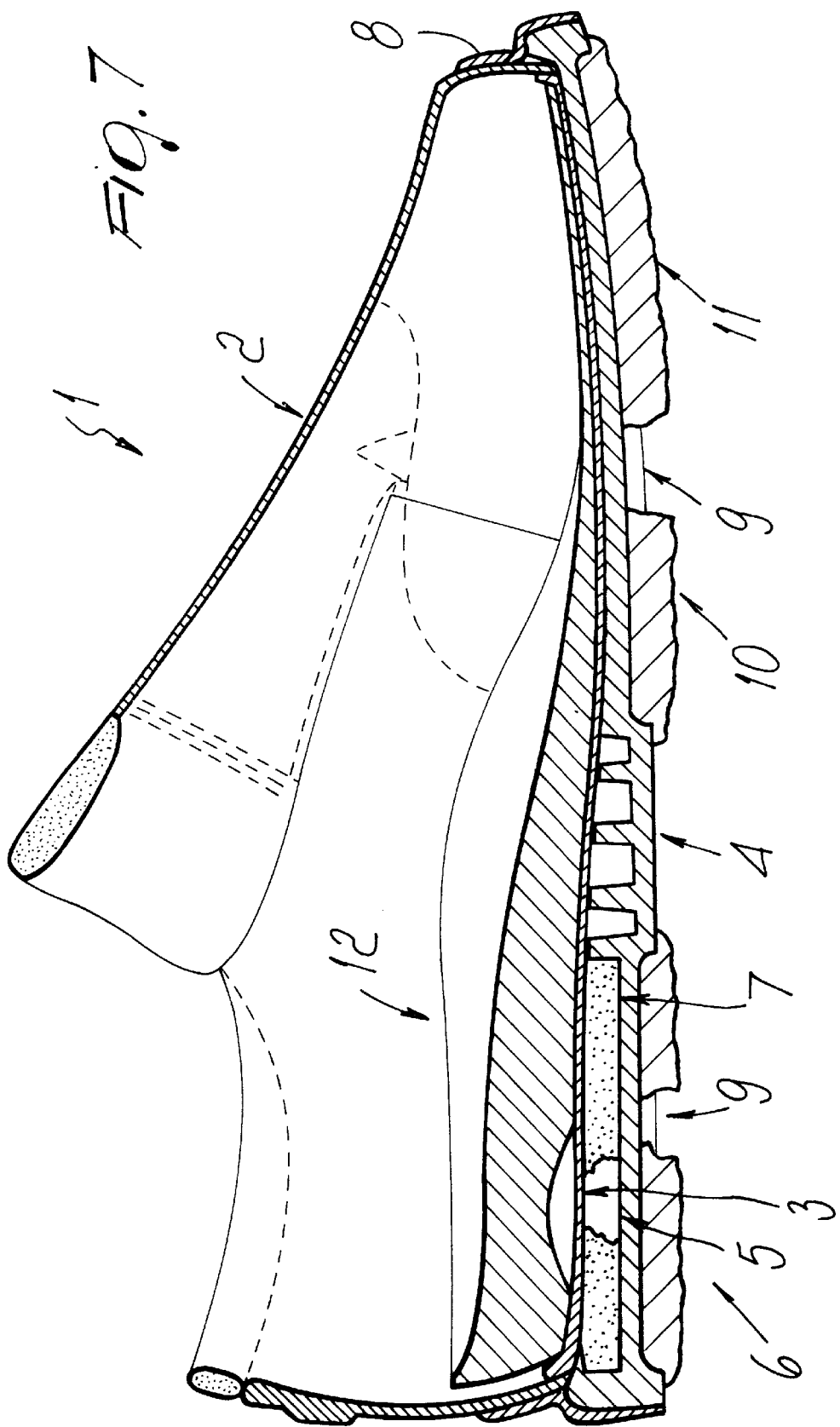

METHOD FOR MANUFACTURING SHOES AND SHOE OBTAINED WITH THE METHOD

BACKGROUND OF THE INVENTION

The present invention relates to a method for manufacturing a shoe and to a shoe obtained by such a method.

It is known to manufacture shoes according to a vulcanization technology.

A typical vulcanized shoe is thus obtained by means of an insole assembly on which the upper (assembly border) is secured. A rubber extruded element is added as a filler and a sole is glued to it. Said sole is made exclusively of vulcanizable rubber as it withstands high temperatures.

The edge of the sole and part of the upper are covered by a crude rubber strip and the entire assembly is then passed to a boiler for vulcanization.

A shoe is obtained having its cover band perfectly glued to its upper and its sole with no stitches. The said shoe, however, has disadvantages owing to its considerable weight due to the fact that it is impossible to use lightweight materials which also withstand high temperatures in the boiler.

SUMMARY OF THE INVENTION

The main object of the present invention is, therefore, to solve the technical problems referred to above, thereby eliminating the drawbacks faced with the prior art solutions by providing a method which makes it possible to obtain a shoe which simultaneously has a large bulk on the last and is lightweight at the same time.

Another important object of the present invention is to provide a method which makes it possible to obtain a shoe which can be manufactured with conventional machines and equipment.

Another important object is to provide a vulcanization method of producing shoes of low weight and highly comfortable for the user while walking.

Another object is to provide a method which makes it possible to obtain a shoe of low cost.

These and other objects which will become better apparent hereinafter, are achieved by a method of manufacturing a shoe, characterized in that it comprises the following steps:

stitching an upper to a piece of canvas in order to obtain an inner shoe which is closed at its lower portion;

providing a rubber mid-sole with one or more first and second innner and outer cavities;

filling said first inner cavities with a lightweight filler;

coupling said closed inner shoe with said mid-sole by means of a cover band;

vulcanization;

placing one or more inserts in said second outer cavities.

A vulcanized shoe obtained by the above specified method, characterized in that it comprises a rubber mid-sole provided with one or more first inner seats for receiving a lightweight filler and one or more second outer seats for receiving a respective insert.

BRIEF DESCRIPTION OF THE DRAWINGS

Further features and advantages of the invention will become better apparent from the detailed description of a specific but not exclusive embodiment thereof, illustrated by way of non-limitative example in the accompanying drawings, wherein:

FIG. 1 is a side view of the shoe;

FIG. 2 is a perspective view from below of the shoe;

FIG. 3 is a side view of the mid-sole;

FIGS. 4 and 5 are perspective side views from below of an insole and mid-sole;

FIG. 6 shows the inserts which can be placed at the second outer cavities;

FIG. 7 is a sectional view of a shoe taken along a longitudinal median plane.

DESCRIPTION OF THE PREFERRED EMBODIMENTS

With reference to the above listed figures, reference numeral 1 designates a shoe comprising an upper 2 which is stitched, at a lower region, to a piece of fabric or canvas 3 so as to obtain an inner shoe which is closed at its lower portion.

The method provides for the production of a rubber mid-sole 4 having a first inner cavity 5 which is formed at the heel region 6.

The method provides for the filling of the internal cavity 5 with a lightweight filler 7, e.g. a mix of natural coconut fiber and pressed latex which is adapted to withstand high temperatures.

The filler 7 can be of a highly vapor-permeable type and also has a shock-absorbing effect such as to cushion the impact of the foot on the ground.

According to further embodiments use can be made of a filler 7 of different materials so long as they have low-weight and high temperature-resistance characteristics for the subsequent vulcanization step.

The method then provides for the coupling of the closed inner shoe obtained by stitching the upper 2 to the canvas 3, with the mid-sole 4, in the first internal cavity 5 of which filler 7 is arranged, by gluing and coupling a peripheral cover band of crude rubber which can be used for vulcanization.

By using then a minimum amount of rubber, vulcanization of the assembly including the inner shoe closed by the mid-sole is carried out.

The said mid-sole has second outer cavities 9 formed at its heel region 6 and at the front region 10.

After vulcanization it is then possible to couple, at the second outer cavities of the mid-sole 4, inserts 11 made of lightweight material, e.g. polyurethane or EVA or other materials such as internal thermoplastic transparent polyurethane (also known as TPU) or other lightweight materials.

The said inserts 11 are thus the inserts that constitute the tread of the shoe and can also include a single component and be molded separately.

Thus, the method makes it possible to obtain by stitching the upper to the piece of fabric or canvas and vulcanizing the closed inner shoe to the mid-sole, which is provided with a semifinished item in its first and second inner cavities and with inserts in its second outer cavities, a shoe of very low weight and provided with shock-absorbing elements at its heel portion to improve user's deambulation.

A suitable insole 12 must then be inserted in the upper 2.

The invention is of course susceptible to numerous modifications and variations, all of which are to be considered as falling within the scope of the invention.

The materials as well as the dimensions of the various components of the shoe can be any according to specific requirements.

The disclosures in Italian Patent Application No. TV97A0000168 from which this application claims priority are incorporated herein by reference.

What is claimed is:

1. A method of manufacturing a shoe, provided with a front region and a heel region, comprising the steps of:

stitching an upper to a piece of fabric in order to obtain an inner shoe which is closed at its lower portion;

providing a rubber mid-sole having at least one inner cavity or seat and at least one outer cavity or seat;

filling said at least one inner cavity with a lightweight filler;

coupling said inner shoe with said mid-sole by means of a peripheral cover band;

vulcanizing;

placing one or more inserts in said at least one outer cavity or seat.

2. A method according to claim 1, wherein said filler comprises a mix of natural coconut fiber and pressed latex which is suitable for withstanding high temperatures.

3. A method according to claim 1, wherein said filler is of vapor-permeable type.

4. A method according to claim 1, wherein said filler has a shock-absorbing effect to cushion impacts of the foot on the ground.

5. A method according to claim 1, wherein said filler comprises lightweight material withstanding the temperatures of said vulcanizing step.

6. A method according to claim 1, wherein said insert is made of polyurethane or EVA or transparent thermoplastic polyurethane.

7. A vulcanized shoe when obtained by the method according to claim 1.

8. A method according to claim 1, wherein said at least one inner cavity or seat is provided at said heel region.

9. A method according to claim 1, wherein a first outer cavity is provided at said heel region and a second outer cavity is provided at said front region.

* * * * *